US009589071B2

(12) United States Patent
Li et al.

(10) Patent No.: US 9,589,071 B2
(45) Date of Patent: *Mar. 7, 2017

(54) QUERY SUGGESTIONS FROM DOCUMENTS

(71) Applicant: Google Inc., Mountain View, CA (US)

(72) Inventors: Youlin Li, Palo Alto, CA (US); Goang-Tay Hsu, San Jose, CA (US); Linda Lin Lin, Beijing (CN)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,143

(22) Filed: Aug. 3, 2015

(65) Prior Publication Data

US 2015/0339311 A1 Nov. 26, 2015

Related U.S. Application Data

(63) Continuation of application No. 13/388,728, filed as application No. PCT/CN2009/000875 on Aug. 4, 2009, now Pat. No. 9,098,568.

(51) Int. Cl.
*G06F 17/30* (2006.01)

(52) U.S. Cl.
CPC ...... *G06F 17/3097* (2013.01); *G06F 17/3064* (2013.01); *G06F 17/30395* (2013.01);
(Continued)

(58) Field of Classification Search
None
See application file for complete search history.

(56) References Cited

U.S. PATENT DOCUMENTS 7,603,381 B2 * 10/2009 Burke ............... G06Q 10/063
705/28
7,689,585 B2 * 3/2010 Zeng ............... G06F 17/30864
707/999.104
(Continued)

FOREIGN PATENT DOCUMENTS

| CN | 101158957 | 4/2008 |
|---|---|---|
| EP | 1587011 | 10/2005 |
| WO | 9859303 | 12/1998 |

OTHER PUBLICATIONS

EP Extended Search Report for EP Application No. EP 09847957.9 (Google Inc.) Jul. 7, 2014.
(Continued)

*Primary Examiner* — Hung Le
(74) *Attorney, Agent, or Firm* — Middleton Reutlinger

(57) ABSTRACT

Methods, systems, and apparatus, including computer program products, for presenting search query suggestions. In an aspect, query triggers in a resource are identified at a client device. For each query trigger identified in the resource, a rank score for the query trigger based on query trigger attributes is calculated at the client device. The query triggers are ranked at the client device based on the rank scores. Search query suggestions are generated at the client device from the query triggers identified in the resource. The search query suggestions include terms of the query triggers, expansion terms of the query triggers, and search query suggestions generated from templates applied to the terms of the query triggers and expansion terms of the query triggers. The search query suggestions are presented at the client device according to the rank of the corresponding query triggers.

22 Claims, 5 Drawing Sheets

(52) U.S. Cl.
CPC .. *G06F 17/30554* (2013.01); *G06F 17/30646* (2013.01); *G06F 17/30654* (2013.01); *G06F 17/30672* (2013.01); *G06F 17/30867* (2013.01)

(56) References Cited

U.S. PATENT DOCUMENTS

| | | | |
|---|---|---|---|
| 7,725,485 | B1 | 5/2010 | Sahami et al. |
| 7,774,003 | B1 | 8/2010 | Ortega et al. |
| 7,890,526 | B1 | 2/2011 | Brewer et al. |
| 7,958,115 | B2 | 6/2011 | Kraft |
| 8,010,523 | B2 | 8/2011 | Djabarov |
| 8,015,199 | B1 | 9/2011 | Sahami et al. |
| 8,027,964 | B2 | 9/2011 | Boulis |
| 8,135,729 | B2 | 3/2012 | Brewer et al. |
| 8,150,869 | B2* | 4/2012 | Jamil ................ G06F 17/30867 706/11 |
| 8,990,240 | B2 | 3/2015 | Hu et al. |
| 9,098,568 | B2 | 8/2015 | Li et al. |
| 2006/0069666 | A1* | 3/2006 | Burke ................. G06Q 10/063 |
| 2006/0248078 | A1 | 11/2006 | Gross et al. |
| 2007/0100915 | A1 | 5/2007 | Rose et al. |
| 2007/0192318 | A1* | 8/2007 | Ramer .............. G06F 17/30867 |
| 2008/0065617 | A1 | 3/2008 | Burke et al. |
| 2008/0147653 | A1* | 6/2008 | Collier ............. G06F 17/30864 |
| 2008/0294619 | A1 | 11/2008 | Hamilton et al. |
| 2009/0019002 | A1* | 1/2009 | Boulis ................ G06F 17/3064 |
| 2009/0024613 | A1* | 1/2009 | Niu ................... G06F 17/30672 |
| 2009/0083232 | A1 | 3/2009 | Ives et al. |
| 2009/0106224 | A1* | 4/2009 | Roulland .......... G06F 17/30646 |
| 2009/0171929 | A1 | 7/2009 | Jing et al. |
| 2009/0187515 | A1 | 7/2009 | Andrew et al. |
| 2009/0234811 | A1* | 9/2009 | Jamil ................ G06F 17/30867 |
| 2009/0313237 | A1* | 12/2009 | Agrawal ............ G06F 17/3064 |
| 2010/0057698 | A1* | 3/2010 | Kantamneni ....... G06F 17/3097 707/E17.015 |
| 2010/0228710 | A1 | 9/2010 | Imig et al. |
| 2010/0250524 | A1 | 9/2010 | Hu et al. |
| 2012/0136886 | A1 | 5/2012 | Brewer et al. |

OTHER PUBLICATIONS

International Search Report and Written Opinion of PCT Serial No. PCT/CN2009/000875. May 13, 2010.
European Patent Office; Communication Pursuant to Article 94(3) EPC, 6 pages, dated Aug. 30, 2016.

* cited by examiner

QUERY SUGGESTIONS FROM DOCUMENTS

BACKGROUND

This specification describes technologies relating to search query suggestions.

The Internet enables access to a wide variety of resources, such as video or audio files, web pages for particular subjects, book articles, or news articles. A search engine can identify resources in response to a search query that includes one or more search terms or phrases. The search engine ranks the resources based on their relevance to the query and importance, generates search results that link to the identified resources, and orders the search results according to the rank. One example search engine is the Google™ search engine provided by Google Inc. of Mountain View, Calif., U.S.A.

Often a user browses a web page and may want to learn more about the subject matter described in the web page. The user may submit to a search engine search terms that the user determines to be related to the subject matter described in the web page, or search terms from that web page. As the user may not accurately express the information that the user desires, the user may repeat the process of refining queries for each page the user browses. While the user may eventually select search terms from a web page that accurately expresses the information the user desires, this repetitive process can degrade the user experience.

SUMMARY

In general, one aspect of the subject matter described in this specification can be embodied in methods that include the actions of receiving at a client device a dictionary defining query triggers, each of the query triggers being one or more terms; identifying at the client device query triggers in a resource; for each query trigger identified in the resource, calculating at the client device a rank score for the query trigger based on attributes of the query trigger; ranking at the client device the query triggers according to the rank scores; generating at the client device search query suggestions from the query triggers identified in the resource; and presenting at the client device the search query suggestions according to the ranking of the query triggers. Other embodiments of this aspect include corresponding systems, apparatus, and computer program products.

Another aspect of the subject matter described in this specification can be embodied in methods that include the actions of receiving at a client device a dictionary defining query triggers, each of the query triggers being one or more terms and having an a popularity score stored in the dictionary, the popularity score being a measure a popularity of query trigger as a query for multiple users of a search engine; rendering a resource in a web browser application on the client device; in response to rendering the resource in the web browser application, identifying at the client device query triggers in the resource; for each query trigger identified in the resource, calculating at the client device a rank score for the query trigger based on attributes of the query trigger and the popularity score of the query trigger; ranking at the client device the query triggers according to the rank scores; generating at the client device search query suggestions from the query triggers identified in the resource; and presenting in the web browser application the search query suggestions with the rendered resource and according to the ranking of the query triggers.

Another aspect of the subject matter described in this specification can be embodied in a system comprising a data processing apparatus and a computer-readable storage medium coupled to the data processing apparatus, the computer-readable medium storing instructions that, when executed by the data processing apparatus, cause the data processing apparatus to perform operations comprising sending to a client device a dictionary defining query triggers, each of the query triggers being one or more terms; sending to the client device a module executable by the client device an upon execution causes the client device to perform operations comprising: identify at the client device query triggers in a resource; for each query trigger identified in the resource, calculating at the client device a rank score for the query trigger based on attributes of the query trigger; rank at the client device the query triggers according to the rank scores;

generate at the client device search query suggestions from the query triggers identified in the resource; and present at the client device the search query suggestions according to the ranking of the query triggers.

Particular embodiments of the subject matter described in this specification can be implemented to realize one or more of the following advantages. The user's personal browsing session information can be used to determine search query suggestions on the client side, and thus the user can maintain such session information in private on the user's client device and still receive personalized search query suggestions. Documents that are not yet indexed by a search service, such as newly published documents, can be analyzed on the client and search queries can be suggested based on the document. The advantages and features listed in the above list are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
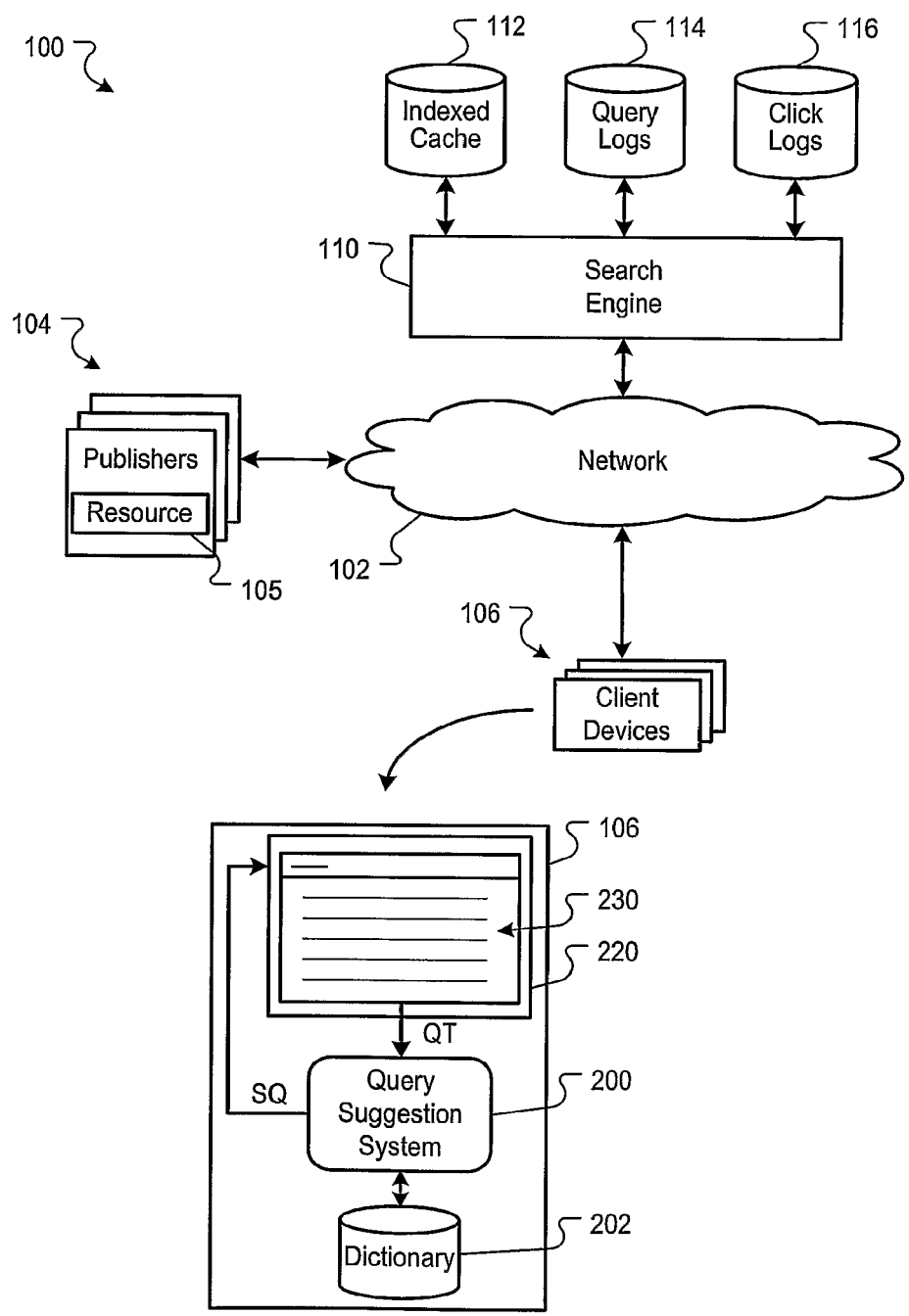
FIG. 1 is a block diagram of an example environment in which a search engine provides search services.

FIG. 1 is a block diagram of an example environment 100 in which a search engine 110 provides search services. A computer network 102, such as a local area network (LAN), wide area network (WAN), the Internet, or a combination thereof, connects publisher web sites 104, client devices 106, and the search engine 110. The online environment 100 may include many thousands of publisher web sites 104 and client devices 106.

A web site 104 is a one or more web page resources 105 associated with a domain name, and each web site is hosted by one or more servers. An example web site is a collection of web pages formatted in hypertext markup language (HTML) that can contain text, graphic images, multimedia content, and programming elements, such as scripts. Each web site 104 is maintained by a publisher, e.g., an entity that manages and/or owns the web site.

A resource is any data that can be provided by the publisher 104 over the network 102 and that is associated with a resource address. Resources include HTML pages, word processing documents, and portable document format (PDF) documents, images, video, and feed sources, to name just a few. The resources can include content, such as words, phrases, pictures, and so on, and may include embedded information (such as meta information and hyperlinks) and/or embedded instructions (such as JavaScript scripts).

A client device 106 is an electronic device that is under the control of a user and is capable of requesting and receiving resources over the network 102. Example client devices 106 include personal computers, mobile communication devices, and other devices that can send and receive data over the network 102. A client device 106 typically includes a user application, such as a web browser, to facilitate the sending and receiving of data over the network 102. The web browser can enable a user to display and interact with text, images, videos, music and other information typically located on a web page at a website on the world wide web or a local area network.

To facilitate searching of these resources 105, the search engine 110 identifies the resources by crawling the publisher web sites 104 and indexing the resources provided by the publisher web sites 104. The indexed and, optionally, cached copies of the resources are stored in an indexed cache 112.

The client devices 106 submit search queries to the search engine 110. In response, the search engine 110 uses the indexed cache 112 to identify resources that are relevant to the queries. The search engine 110 identifies the resources in the form of search results and returns the search results to the client devices 106 in search results pages. A search result is data generated by the search engine 110 that identifies a resource that satisfies a particular search query, and includes a resource locator for the resource. An example search result can include a web page title, a snippet of text extracted from the web page, and the URL of the web page.

The search results are ranked based on scores related to the resources identified by the search results, such as information retrieval ("IR") scores, and optionally a separate ranking of each resource relative to other resources (e.g., an authority score). In some implementations, the IR scores are computed from dot products of feature vectors corresponding to a query and a resource, and the ranking of the search results is based on relevance scores that are a combination of the IR scores and authority scores. The search results are ordered according to these scores and provided to the client device according to the order.

The client devices 106 receive the search results pages and render the pages for presentation to users. In response to the user selecting a search result at a client device 106, the client device 106 requests the resource identified by the resource locator included in the selected search result. The publisher of the web site 104 hosting the resource receives the request for the resource from the client device 106 and provides the resource to the requesting client device 106.

The queries submitted from client devices 106 are stored in query logs 114. Click data for the queries and the web pages referenced by the search results are stored in click logs 116. The click data define actions taken responsive to search results provided by the search engine 110. The query logs 114 and click logs 116 can be used to map queries submitted by the client devices to web pages that were identified in search results and the actions taken by users. If time data are also stored, then the relative times at which those actions were taken and when the queries were submitted can also be determined. The click logs 116 and query logs 114 can thus be used by the search engine to the sequence of queries submitted by the client devices, the actions taken in response to the queries, and how often the queries are submitted.

After reviewing a resource, such as a web page, a user may want to view additional resources describing subject matter related to the subject matter described in the browsed resource. In some implementations, one or more client devices 106 can be configured to provide search query suggestions to the user based on the resource currently being browsed.

A particular client device 106 that includes a query suggestion system 200 is illustrated in additional detail in FIG. 1. The client device 106 includes a query suggestion system 200 and a dictionary 202 of query triggers. The query suggestion system 200 accesses the dictionary 202 and processes the content 230 of a web page displayed on a display device 220 to identify query triggers (QT) present in the content 230. Using the identified query triggers and the dictionary 202, the query suggestion system 200 generates suggested queries (SQ) that are displayed on the client device 106.

Figure 2:
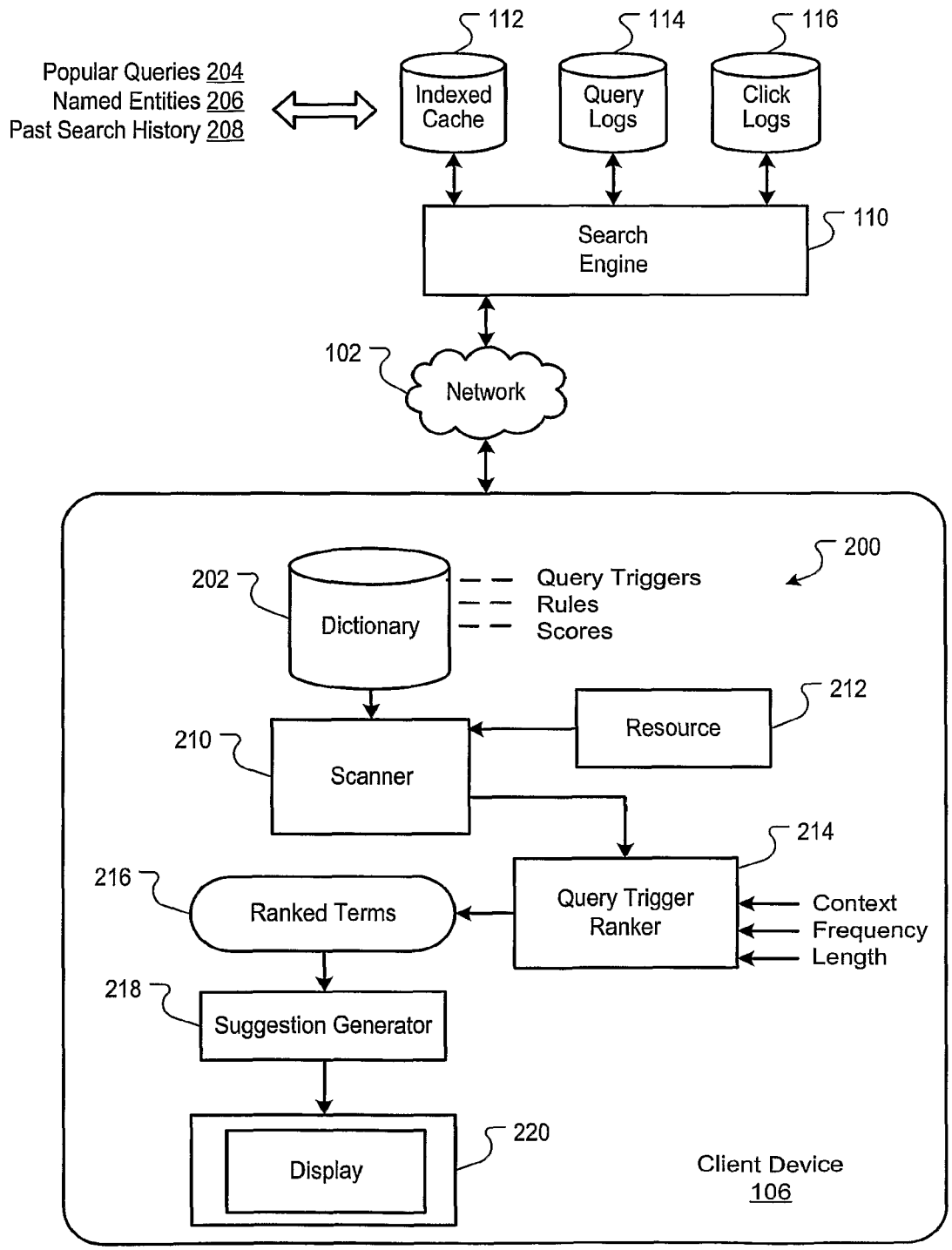
FIG. 2 is a block diagram of a system that provides search query suggestions at a client device.

As will be described in greater detail below, when the query triggers are found in a resource, a search query suggestion can be provided to the user for the user to conduct additional searches using the search query suggestion. FIG. 2 is a block diagram of a system 200 that provides search query suggestions at a client device. The client device 106, can for example, be one of the client devices 106 of FIG. 1. In some implementations, the system functionality described below can be provided by one or more software modules, such as a toolbar application or browser plug-in installed on a browser on the client device 106. Although particular components are described, separate components need not be implemented to realize the corresponding functions described below. For example, all of the functions describe with respect to the components below can be realized in a single software module or process.

The client device 106 can receive a dictionary 202 of query triggers that are used to search resources rendered on the client device 106. The dictionary can, for example, be created by the search engine 110 and be downloaded to the client device 106 at predetermined time periods, e.g., a predetermined number of days or hours. Alternatively, the dictionary can be provided by a third party.

In some implementations, new query triggers can be added to the dictionary 202 after it was downloaded to the client device 106 during a scheduled update. A scheduled update downloads only updates to the dictionary 202 instead of an entire dictionary 202.

In some implementations, the query triggers of the dictionary 202 are search query terms and expansion terms for those search query terms. For example, the search query terms can be popular queries 204, as determined by the search engine 110, and synonyms for the popular queries 204. Popular queries are queries that are submitted to the search engine 110 in excess of a threshold number of times for a given time period. The time period can vary, and multiple time periods can be used. For example, time periods of a relatively short duration, e.g., a day, can be used to identify popular trend queries, while time periods of longer time period, e.g., a month or a year, can be used to identify popular consistent queries. The popular queries can be determined by the search engine 110 and added to the dictionary 202.

The expansion terms include synonyms or queries that are determined to be related to the popular queries according to a relatedness criterion, e.g., a topic criterion or query co-occurrence criterion. Other relatedness criteria can also be used. For example, if the query "election" is a popular query because it has been submitted in excess of a threshold number of times for a given time period, the dictionary 202 can also include "referendum" as an expansion term for the term "election" because the term "referendum" is a synonym of the term "election."

Query co-occurrence is the occurrence of a first query with a second query from a client device 106 within a co-occurrence measure. Example co-occurrence measures for two queries include the two queries being submitted within a pre-defined time period, e.g., five minutes, or the two queries having no more than a maximum number of intervening queries between two queries, e.g., ten intervening queries. If the query logs 114 indicate a threshold number or rate of query co-occurrences for two queries, then the one of the two queries can be determined to be expansion terms for the other query. For example, if the query terms "Republication convention" are a popular query, the dictionary 202 can also include "GOP" and "GOP convention" as expansion terms if these queries may a high degree of query co-occurrence with the query "Republican convention."

In some implementations, the query triggers include entity names. Entity names describe unique entities as distinguished from a common class of entities, e.g., proper nouns in the English language. Examples of entity names include the names of persons, organizations, locations, expressions of times, monetary values, etc. For example, "New York" is an entity name because describes a unique city instead of cities in general. "Obama" is an entity name because it is the name of a person.

In some implementations, expansion terms for the entity names are included in the dictionary 202. The expansion terms for entity names include synonyms or queries that are determined to be related to the popular queries according to a relatedness criterion, e.g., a topic criterion or query co-occurrence criterion. For example, the query terms "Big Apple" can be expansion terms for the entity name "New York," as the terms "Big Apple" constitute a synonym of the entity name "New York." Likewise, the query terms "President of the United States" can be expansion terms for "Obama," as the terms "President of the United States" may have a high query co-occurrence with the query "Obama".

In some implementations, the dictionary 202 can also include rules that govern the use of the query triggers when searching a resource. The rules can, for example, define valid and/or invalid combinations of query triggers; whether a query trigger that includes two or more terms is determined to be found in a resource if less that all of the two or more terms are found in the resource; and whether stemming or plural forms of a query trigger are allowable.

In some implementations, the dictionary 202 can include attributes of the query triggers. Example attributes can include one or more scores for each of the query triggers. The scores can be based on metrics related to the use of queries that include the query triggers by users. Example scores can be based on popularity metrics, such as a popularity score measuring the popularity of the query over one or more time periods.

Scores can also be based on a query history score that measures the frequency at which a query, when suggested to users, is selected by the users. When a suggested query is selected on a client device, the query is provided to the search engine 110 with data indicating that the query was suggested. Suggested queries that are accepted are known as "assisted queries" and the selection rate can be tracked by the search engine 110. The search engine 110 can use the selection rate to determine a query history score. For example, a first query trigger that was provided N times as a search query suggestion and which the users selected 60% of the time will have a higher query history score than a second query that was provided N times as a suggestion and only selected 40% of the time. A query trigger ranker 214 performed at the client devices uses these score to rank query triggers for search query suggestions.

Another example score that can be included in the dictionary 202 is a page frequency score. The page frequency score is a measure of the number of resources in a corpus of resources in which the term appears. For example, if the term "Air France" appears in 75,000 web pages in the indexed cache 112, then the page frequency for this term is proportion to 75,000, e.g., 75,000 divided by the total number of indexed web pages.

Other example attributes include language indicators of the query trigger. The ranking process can use the language indicators to discount a query trigger if the query trigger present in a resource does not match the primary language of the resource. For example, query triggers that are in the English language can be discounted or ignored if they are identified in a resource that is written predominately in French.

Another example attribute includes a document frequency of the query trigger. The document frequency is a measure of how many times the query trigger occurred in all documents indexed in the indexed cache divided by the number of documents indexed in the indexed cache. The document frequency is used to measure of how relevant a query trigger is to a resource. For example, a first query trigger may have document frequency 0.005, and a second query trigger may have a document frequency of 0.1. If both query triggers occur five times in a resource, then the first query trigger more relevant to the resource than the second query trigger.

A scanner 210 accesses the dictionary 202 and scans the text in a resource 212 to identify query triggers defined in the dictionary that are present in the resource 212. The resource 212 can, for example, be a web page. In some implementations, the scanner 210 can use the rules in the dictionary 202 when scanning the resource to determine if query triggers are present in the resource. For example, if the dictionary 202 includes the query trigger "primary," and a rule indicates that the query trigger "primary" can be singular or plural in a resource, the scanner 210 can identify the word "primaries" in a resource as a query trigger because it is a plural form of the query trigger "primary."

In some implementations, the scanner 210 can scan the resource 212 using a DOM tree. Text in the resource 212 can be selected from text nodes in the DOM tree. In other implementations, other scanning techniques can be used to resource 212.

In some implementations, a first thread can be used for scanning the resource 212 according to the DOM tree. The rest of the processing described below can be performed by a separate independent thread after the scanning is completed. In other implementations, if a browser does not allow for separate threads, all of the processing including the scanning and the DOM access can occur in a single thread.

In some implementations, the scanner 210 can be configured to scan only titles and headings in a resource 212 if the resource 212 is determined to be exceed a maximum scan size. For example, if a resource 212 includes a number of words above a certain threshold amount, the scanner 210 will only scan the title or heading in the resource 212 instead of the entire body of the resource 212.

The scanner 210 can determine additionally query trigger attributes for each query trigger identified in the resource 212. The query trigger attributes are used by the ranking process to calculate a rank score for the query trigger. Example query trigger attributes include a frequency of occurrence of the query trigger, a context of the query trigger, a length of the query trigger, and a client history score.

To determine the frequency of occurrence of a query trigger, the scanner 210 counts the occurrence of the query trigger the resource 212. The frequency of occurrence can be a raw score, e.g., the total number of times the query trigger appears in the resource, or can be proportional to the raw score, e.g., the raw score divided by the total number of words in the resource.

The scanner 210 determines the context of a query trigger in the resource 212 by identifying the display format of the query trigger in the resource. Example display formats include bold, underline, italicized, highlighted, footnoted, or a different size font than the rest of the text of the resource 212. The context can also include, for example, whether the query trigger appeared in the title or in a heading in the resource 212. In some implementations, each type of context can be associated with a weight and the weight can be used to determine a rank score for ranking the search query suggestions, as will be described in greater detail below.

The scanner 210 determines the term length of a query trigger in the resource 212, in some implementations, by counting the individual terms in the query. For example, the term "Obama" has a term length of one; "President of the United States" has a term length of five, etc.

In other implementations, the term length is equal to the number of characters in the query. For example, the query trigger "Obama" has a term length of five, and the query trigger "New York" has a term length of seven.

A longer term length can result in a higher rank score. The term length is an indicator of an inverse document frequency, i.e., the longer the query trigger terms, the more likely that the terms are not common terms. Accordingly, query triggers with term lengths that are longer than term lengths of other query triggers are ranked higher than the other query triggers, provided all other raking factors are equal.

The scanner 210 determines the client history score of a query trigger based on the immediate browsing history of the client. In some implementations, previous searches and resources visited by the client can be used to determine the client history score. For example, if the query trigger "Obama," is identified in a resource, and the queries previously submitted from the client are "Obama economic plan" and "Obama treasury appointment," the scanner 210 will generate a client history score that is higher than would be generated if the queries previously submitted from the client did not include the queries "Obama economic plan" and "Obama treasury appointment."

The query trigger ranker 214 uses the query trigger attributes of each query trigger identified in the resource to generate ranks scores for ranking the identified query triggers. The query trigger ranker 214 can compute a score for each query trigger identified in the resource 212 using the query trigger attributes. Various computations can be used to compute the score. For example, the score can be an aggregate function of the attribute values and weights associated with the attribute values; or can be a product function of the attribute values and weights associated with the attribute values; or combinations thereof.

The query trigger ranker 214 ranks the query triggers identified in the resource 212 based on the rank scores to create a set of ranked terms 216. The ranking process can optionally select a predetermined number of top ranked terms 216, e.g., five, from which search query suggestions can be generated.

In some implementations, a suggestion generator 218 can use predefined templates to generate suggested queries for each top ranked query trigger. The dictionary 202 can include query templates associated with the query triggers. An example query template for a query trigger includes a variable and a string. The variable corresponds to one or more terms of the query trigger and the expansion terms of the query trigger, and the string defines one or more additional terms different from one or more terms of the query trigger and the expansion terms of the query trigger.

Using the template, the suggestion generator 218 can generate search query suggestions. For example, the suggestion generator 218 can select a query template associated with a query trigger, and using one of the query trigger or expansion terms of the query trigger as an argument for the variable of the selected query template, generate a search query suggestion from the argument and the string. For example, the template %trigger:obama%news is associated with the query trigger "Obama." If this query trigger is identified in the resource 212 the template can be applied to create the suggested query "Obama news."

In some implementations, the templates can also be used to create suggested queries that do not include terms of the query trigger found in the resource, i.e., the template can require that an expansion term be used For example, the template %trigger:obama→campaign%news is associated with the query trigger "Obama" and specifies that the expansion term "campaign" of the query trigger be used to generate a suggested query. Therefore, if the resource 212 includes the term "Obama" the suggested query formed is "campaign news."

In some implementations, the templates can be created from popular queries and query co-occurrences. Such queries can be analyzed and common terms that appear often can identified for use in templates. For example, popular queries may include "election news," "campaign news," "news about election." Therefore, based on these queries, the template "%trigger:term%news" can be formed so that the term "news" is added to an associated query trigger identified in a resource to create a suggested query.

In some implementations, the query triggers can be provided as suggested queries. For example, if a query trigger "White House" is identified in the resource 212, the suggestion generator 218 can provide "White House" as a suggested query.

In some implementations, the immediate browsing history of the client device 106 can be used to filter search query suggestions. The suggested queries can be checked against the immediate browsing history to determine if a user previously selected and submitted one of the search query suggestions. If the user did submit the suggested search query recently, e.g., within a current search session or within N last query submissions, then the search query suggestion will not be provided. Alternatively, an associated template can be used to change the search query suggestion, e.g., an expansion term substituted for the query trigger term found in the resource 212.

For example, assume the suggested query "campaign news" is created and is going to be presented as a search query suggestion. The client device 106 can determine that the user already had requested a search using the query "campaign news" during the current search session. Therefore, either the search query suggestion "campaign news" can be removed as a suggestion or alternatively, a template can be applied to the search query suggestion "campaign news."

In some implementation, suggestion templates, stored in the dictionary 202, can be used for altering search query suggestions that have recently been used by a user. For example, a template %search query suggestion% developments" can be applied to a search query suggestion. Therefore, in this example, the search query suggestion can be changed from "campaign news" to "campaign news developments."

In some implementations, the search query suggestion associated with the top ranking query trigger can be displayed on a toolbar search box associated with a browser on the display 220. In some implementations, the search query suggestions can be sequentially presented in the search box. For example, each of search query suggestion can be presented singularly for a predefined time period in the toolbar search box. After thirty seconds, a first search query suggestion generated based on the top most ranking term can be replaced by a second search query suggestion generated based on the second top ranking term. The process can continue until a suggestion is selected, and can repeatedly cycle the suggested search queries.

In some implementations, a language segmentation may be needed for certain languages that do not include spaces between words. For example, the Chinese language does not have spaces between words. For these implementations, the dictionary 202 includes a language dictionary with language models that define segmentations of Chinese words. The segmented words as used a query triggers.

In some implementations, instead of using segmentation, a term-by-term match to the dictionary words is used. In these implementation, an occurrence threshold defining a minimum number of occurrences of the matched word in a web page can also be used. If the matched term occurs in the web page a number of times that is equal to or greater than the occurrence threshold, the client device determines that that the query trigger is present in the web page.

Figure 3A:
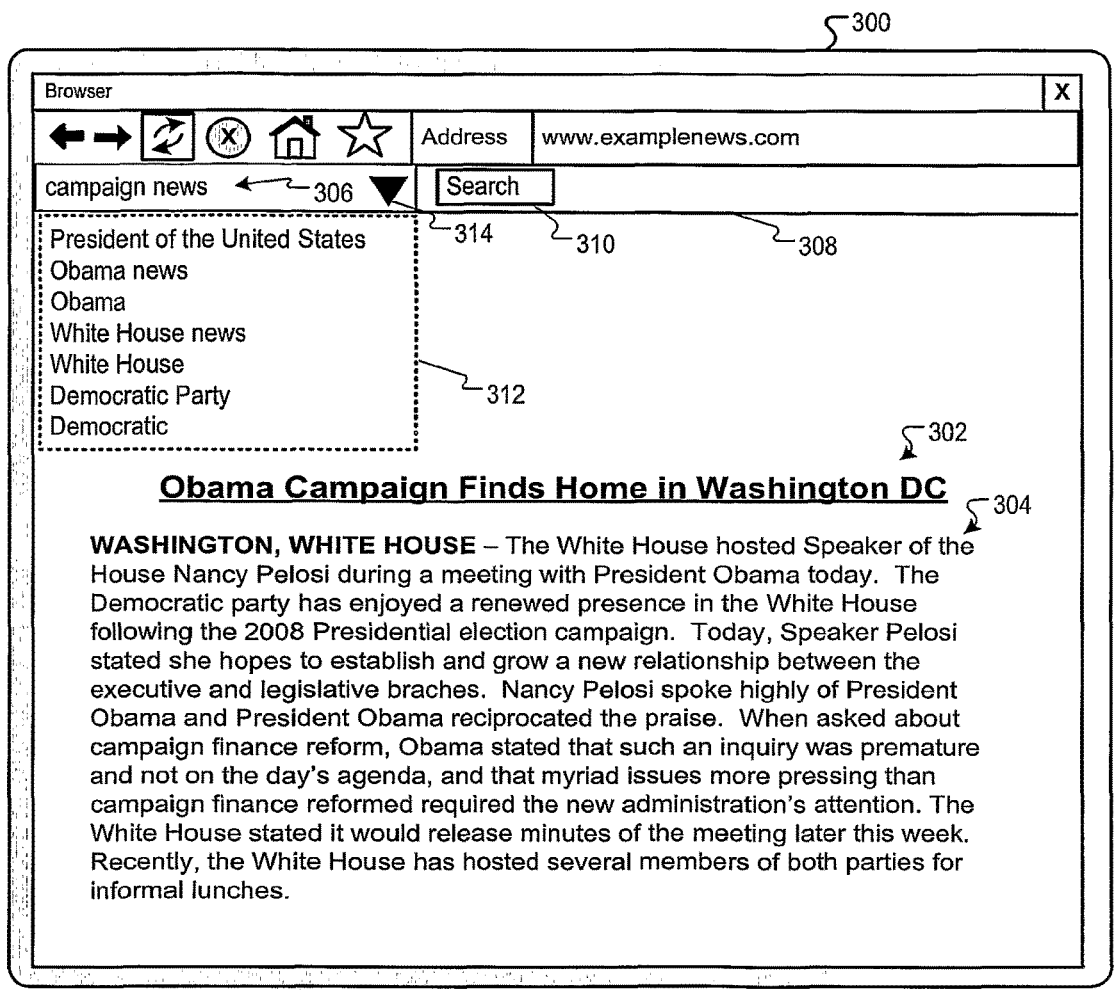
FIG. 3A depicts an example web page displaying search query suggestions.

FIG. 3A depicts an example web page 300 displaying search query suggestions. The web page 300 includes the heading 302 "Obama in Washington D.C." The web page 300 also includes content with text 304 of a news report.

The client device on which the web page 300 is displayed, e.g., client device 106, includes the system 200 of FIG. 2. The client device 106 has received a dictionary 202 and has identified query triggers "Obama," "Democratic," and "White House" that are included in a dictionary 202. While additional query triggers could be defined in the dictionary 202, for the purposes of illustration it is assumed that only the above-referenced query triggers are present in the dictionary.

The client device 106 also identifies query trigger attributes associated with each of the query triggers in the web page 300. For example, the client device 106 determines that the query trigger "Obama" appears five times in the web page 300 and therefore is associated with a frequency of five. Additionally, the client device 106 determines that the query trigger "Obama" has a term length of five, and appears in bold one time and with underlining one time in a heading context in the web page 300.

For the query trigger "Democratic", the client device 106 determines that the query trigger appears only once and therefore is associated with a frequency of one; has a term length of 10; and is not associated with any context.

For the query trigger "White House", the client device determines that the query trigger appears four times and therefore is associated with a frequency of four; has a term length of 10; and appears in bold one time in the web page 300.

Based on these query trigger attributes, the client device 106 calculate a rank score for each of the query triggers. In some implementations, the ranks scores are based on a formula that receives as input the frequency (f), term length (TL), weights associated with the context characteristics ([CW]), and document frequency (df), e.g., Rank score=f(f, TL, [CW], df)

The function f can be a linear or non-linear function. In the example above, the query trigger Obama receives the highest ranks score, the query trigger "White House" receives the second highest rank score, and the query trigger "Democratic" receives the third highest rank score. Thus, the client device 106 ranks the query triggers based on the rank scores, and therefore the query triggers are ranked as follows: "Obama," White House," and "Democratic."

The client device 106 then determine whether any templates are to be applied to the query triggers to create query suggestions. For example, a first template specifies that if the term "Obama" is identified as a query trigger, then the search query suggestion is "campaign news;" a second template specifies that if the term "Obama" is identified as a query trigger, then the expansion terms "President of the United States" is provided as a query trigger; and a third template specifies that if the term "White House" is identified as a query trigger, then the search query suggestion is "White House news."

In some implementations, each query trigger can likewise have an associated weight that is used to rank the resulting suggested queries. For example, a template that appends the string "news" to a query trigger term or query trigger expansion term may be weighted higher than the query trigger term or query trigger expansion term, and thus the resulting query suggestion generated from that template are ranked higher than the query triggers.

Assume that the template "campaign news" has the highest template weight; as the query trigger "Obama" is the highest ranking of the three query triggers, the search query suggestion "campaign news" 306 is first displayed in a toolbar 308 search input box. A user can then determine whether to search for additional web pages using the search query suggestion "campaign news" 306 by selecting the search button 310.

If the user does not select the search button 310, additional query suggestions can be sequentially presented in the toolbar 308 search input box for a predefined time period, e.g., five seconds. These additional query suggestions that are sequentially presented are illustrated within the dashed column 312. The respective sequence of presentation is from the top down, i.e., if the query "campaign news" is not selected, then the suggested query "President of the United States" will be shown next. In some implementations, if no suggested queries are selected, i.e., the sequence progresses through the "Democratic" query suggestion, then the sequence can repeat. In other implementations, if no suggested queries are selected, suggested queries are no longer shown.

Additionally, in some implementations, a user can select an expansion control 314, and in response the client device 106 can display all of the suggested queries shown in the column 312 within an expansion box that is approximately the dimensions of the column 312.

Figure 3B:
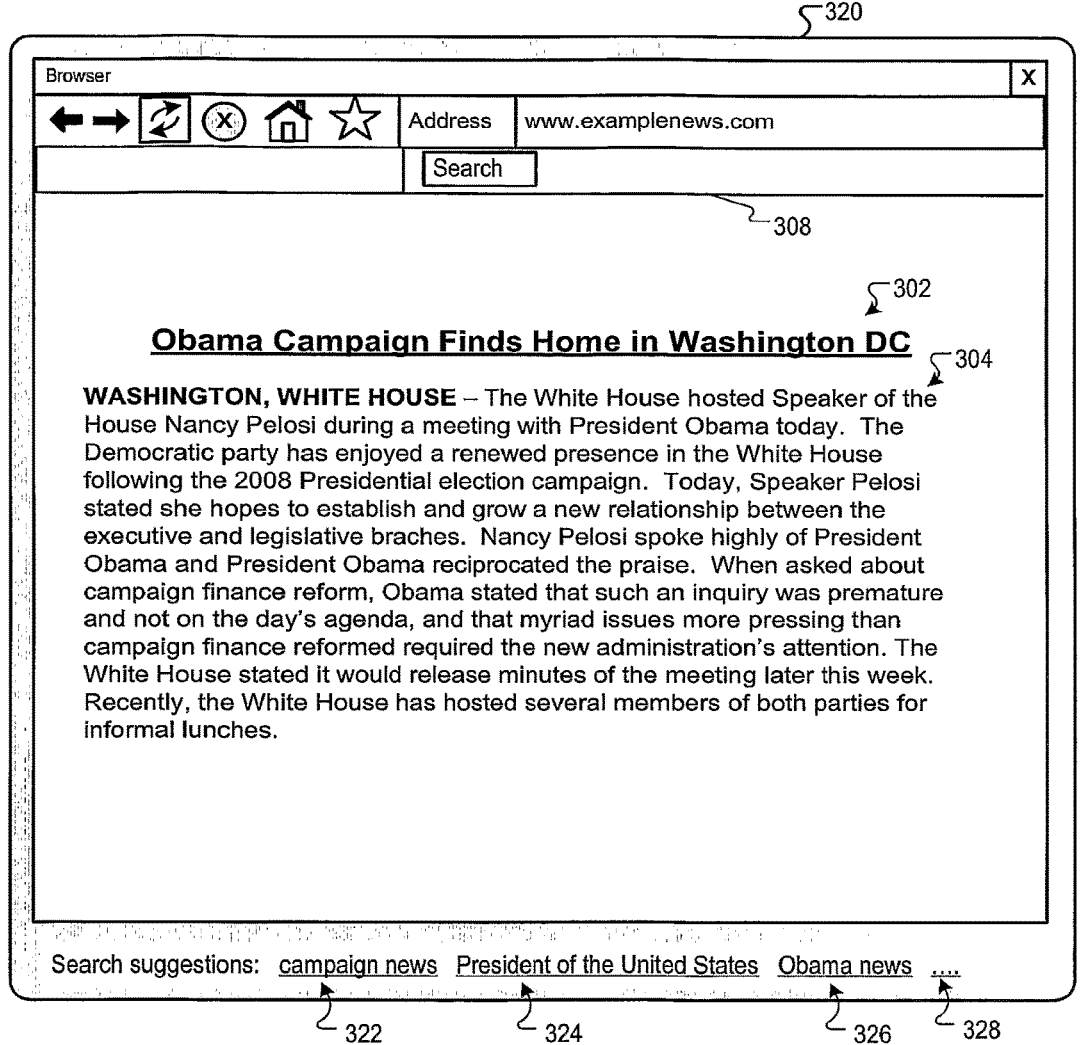
FIG. 3B depicts an example web page displaying search query suggestions.

FIG. 3B depicts an example web page 320 displaying search query suggestions. The web page 320 is similar to the web page 300 of FIG. 3A, except that suggested queries 322, 324 and 326 are shown at the bottom of the web page 320. The suggested queries are shown, for example, in the order of their respective ranking, with the top three queries displayed. Each of the queries is shown as a hyperlink, and selecting one of the queries causes the client device to submit the suggested query as a search query to a search engine.

An ellipsis hyperlink 326 is displayed if there are additional query suggestions available. In some implementations, selection of the ellipsis hyperlink 326 causes the next top N queries to be displayed at the bottom of the page. In other implementations, selection of the ellipsis hyperlink 326 causes the client device 106 to display all of the suggested queries within an expansion box, similar to the expansion box described with reference to FIG. 3A.

Figure 4:
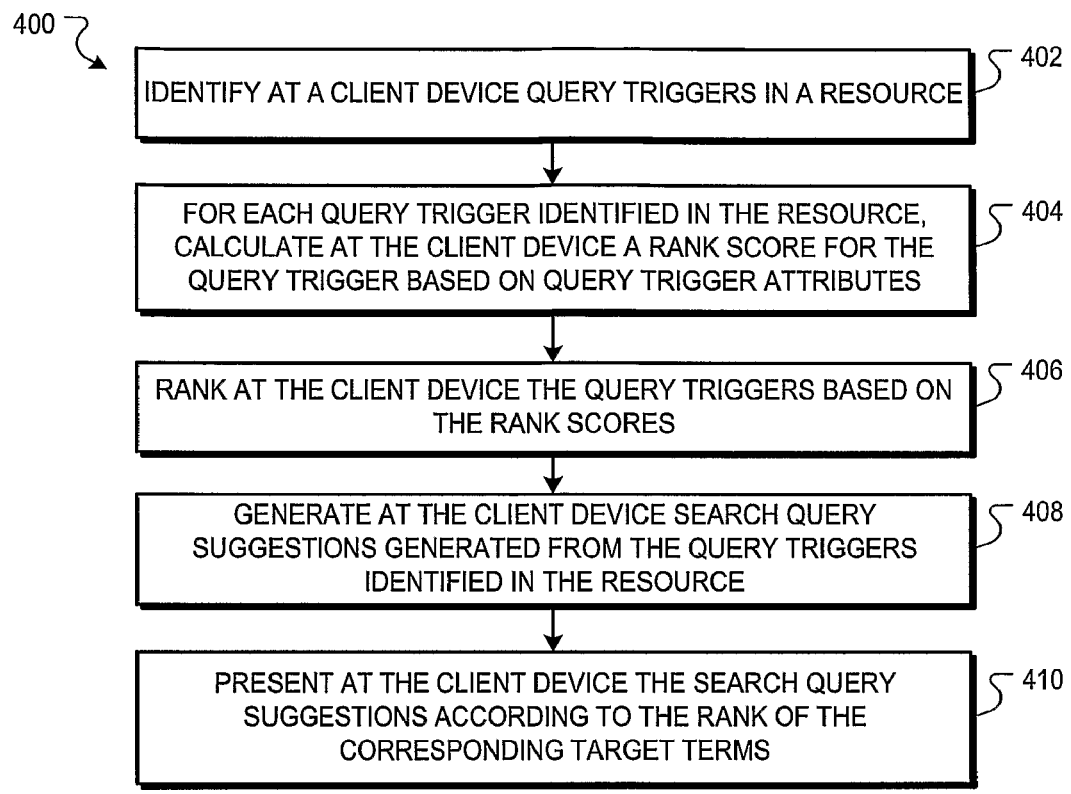
FIG. 4 is a flow diagram of an example process for providing search query suggestions.

FIG. 4 is a flow diagram of an example 400 process providing search query suggestions. The example process 400 can be performed by the client device 106 implementing the query suggestion system 200.

Query triggers in a resource are identified at a client device (402). For example, the scanner 210 can access a dictionary 202 of query triggers and search the content of a displayed resource, such as a web page, for the occurrence of the query triggers.

For each query trigger identified in the resource, a rank score for the query trigger based on query trigger attributes is calculated at the client device (404). For example, the query trigger ranker 214 can generate the rank scores. In some implementations, the query trigger attributes can be based on a frequency of occurrence, a display context, and a query trigger length. In some implementations, corresponding weights associated with the context and the length are stored in the dictionary 202. The rank score can be calculated on the client device 106 as a function of one or more of the query trigger attributes.

The query triggers are ranked at the client device based on the rank scores (406). In some implementations, the top N ranked query triggers are used to generate search query suggestions.

Search query suggestions are generated at the client device from the query triggers identified in the resource (408). For example, the suggestion generator 218 can generate the query suggestions. In some implementations, a template can be used to generate the query suggestions. The template can, for example, specify that terms be added to the query triggers or that expansion terms be used. Additionally, an identified query trigger itself can be provided as the search query suggestion. Alternatively or additionally, an expansion term of the query trigger can be used as a search query suggestion, or a template can be applied to the expansion term to generate the search query suggestion.

The search query suggestions are presented at the client device according to the rank of the corresponding query triggers (410). In some implementations, the search query suggestion associated with the top ranking query trigger can be displayed on a toolbar associated with a browser on the client device 106. After a predetermined period of time, the search query suggestion can be replaced by a new search query suggestion associated with the next top ranking query trigger.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, such as a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A computer-implemented method, comprising:
   receiving at a client device a dictionary defining query triggers, each of the query triggers being one or more terms;
   identifying, at the client device, one or more of the query triggers in a resource, the resource being a non-query resource rendered in an application at the client device, and the identifying the query triggers in the resource including scanning the resource to identify the query triggers defined in the dictionary that are present in the resource;
   for each query trigger identified in the resource, calculating at the client device a rank score for the query trigger based on attributes of the query trigger;
   ranking at the client device the query triggers according to the rank scores;
   generating at the client device search query suggestions from the query triggers identified in the resource; and
   presenting at the client device the search query suggestions according to the ranking of the query triggers.

2. The computer-implemented method of claim 1, wherein:
   the query triggers include expansion terms, the expansion terms for each query trigger being terms that are query expansions of the one or more terms of the query trigger;
   identifying the query triggers in the resource comprises searching the resource for the query triggers included in the dictionary; and
   generating search query suggestions from the query triggers comprises generating for a query trigger identified in the resource a search query that includes an expansion term of the query trigger.

3. The computer-implemented method of claim 2, wherein:
   the dictionary of query triggers includes query templates associated with the query triggers, each query template associated with a query trigger and including a variable and string, the variable corresponding to one or more terms of the query trigger and the expansion terms of the query trigger, and the string defining one or more additional terms different from one or more terms of the query trigger and the expansion terms of the query trigger; and
   generating search query suggestions from the query triggers comprises:
      selecting a query template associated with a query trigger;
      using one of the query trigger or expansion terms of the query trigger as an argument for the variable of the selected query template; and
      generating the search query suggestion from the argument and the string.

4. The computer-implemented method of claim 2, wherein the one or more terms of the query triggers define entity names, the entity names being names of persons and names of places.

5. The computer-implemented method of claim 1, wherein presenting at the client device the search query suggestions according to the ranking of the query triggers comprises:
   sequentially presenting each of search query suggestions for a predefined time period in a toolbar of a web browser displaying the resource.

6. The computer-implemented method of claim 1, wherein:

the attributes of the query trigger include:
  a context of the query trigger defined by a display format of the query trigger in the resource; and
  a frequency of occurrence of the query trigger in the resource; and
calculating at the client device a rank score for the query trigger based on attributes of the query trigger comprises generating the rank score based on a function of the context of the query trigger and the frequency of occurrence of the query trigger.

7. The computer-implemented method of claim 6, wherein:
the attributes of the query trigger further include a popularity score of the query trigger, the popularity score stored in the dictionary and being a measure a popularity of the query trigger in queries for multiple users of a search engine; and
calculating at the client device a rank score for the query trigger based on attributes of the query trigger comprises generating the rank score based on a function of the popularity of the query trigger, the context of the query trigger, and the frequency of occurrence of the query trigger.

8. The computer-implemented method of claim 7, wherein each of the one or more terms of the query triggers are queries received from users of the search system and have a popularity score exceeding a minimum popularity threshold.

9. The computer-implemented method of claim 6, wherein:
the attributes of the query trigger further include a query history score of the query trigger, the query history score stored in the dictionary and being a measure of a selection of a suggested query generated from the query trigger for multiple users of a search engine; and
calculating at the client device a rank score for the query trigger based on attributes of the query trigger comprises generating the rank score based on a function of the query history score of the query trigger, the context of the query trigger, and the frequency of occurrence of the query trigger.

10. The computer-implemented method of claim 6, further comprising:
storing client history data at the client device, the client history data storing a search history that includes queries provided to a search engine from the client device;
calculating a client history score for query triggers identified in the resource; and
calculating at the client device a rank score for the query trigger based on attributes of the query trigger comprises generating the rank score based on a function of the context of the query trigger, the frequency of occurrence of the query trigger, and the client history score of the query trigger.

11. The computer-implemented method of claim 1, further comprising rendering the resource in a first thread of a browser application at the client device; wherein identifying the query triggers in the resource comprises identifying the query triggers in a second thread of a browser application, the second thread independent of the first thread.

12. A system, comprising:
a data processing apparatus; and
a computer-readable storage medium coupled to the data processing apparatus and storing a dictionary defining query triggers, each of the query triggers being one or more terms;

wherein the computer-readable medium also stores instructions that, when executed by the data processing apparatus, cause the data processing apparatus to perform operations comprising:
identifying one or more of the query triggers in a resource displayed in a web browser application environment on the data processing apparatus, the resource being a non-query resource rendered in an application at the client device, and the identifying the query triggers in the resource including scanning the resource to identify the query triggers defined in the dictionary that are present in the resource;
for each query trigger identified in the resource, calculating a rank score for the query trigger based on attributes of the query trigger;
ranking the query triggers according to the rank scores;
generating search query suggestions from the query triggers identified in the resource; and
presenting the search query suggestions in the web browser application environment according to the ranking of the query triggers.

13. The system of claim 12, wherein:
the query triggers include expansion terms, the expansion terms for each query trigger being terms that are query expansions of the one or more terms of the query trigger; and
identifying the query triggers in the resource comprises searching the resource for the query triggers included in the dictionary; and
generating search query suggestions from the query triggers comprises generating for a query trigger identified in the resource a search query that includes an expansion term of the query trigger.

14. The system of claim 13, wherein:
the dictionary of query triggers includes query templates associated with the query triggers, each query template associated with a query trigger and including a variable and string, the variable corresponding to one or more terms of the query trigger and the expansion terms of the query trigger, and the string defining one or more additional terms different from one or more terms of the query trigger and the expansion terms of the query trigger; and
generating search query suggestions from the query triggers comprises:
  selecting a query template associated with a query trigger;
  using one of the query trigger or expansion terms of the query trigger as an argument for the variable of the selected query template; and
  generating the search query suggestion from the argument and the string.

15. The system of claim 13, wherein the one or more terms of the query triggers define entity names, the entity names being names of persons and names of places.

16. The system of claim 12, wherein presenting at the client device the search query suggestions according to the ranking of the query triggers comprises:
sequentially presenting each of search query suggestions for a predefined time period in a toolbar of a web browser displaying the resource.

17. The system of claim 12, wherein:
the attributes of the query trigger include:
  a context of the query trigger defined by a display format of the query trigger in the resource; and
  a frequency of occurrence of the query trigger in the resource; and calculating at the client device a rank score for the query trigger based on attributes of the query trigger comprises generating the rank score based on a function of the context of the query trigger and the frequency of occurrence of the query trigger.

18. The system of claim 17, wherein:
the attributes of the query trigger further include a popularity score of the query trigger, the popularity score stored in the dictionary and being a measure a popularity of the query trigger in queries for multiple users of a search engine; and
calculating at the client device a rank score for the query trigger based on attributes of the query trigger comprises generating the rank score based on a function of the context of the query trigger, the frequency of occurrence of the query trigger, and the popularity of the query trigger;
wherein each of the one or more terms of the query triggers are queries received from users of the search system and have a popularity score exceeding a minimum popularity threshold.

19. The system of claim 17, wherein:
the attributes of the query trigger further include a history score of the query trigger, the history score stored in the dictionary and being a measure of a selection of a suggested query generated from the query trigger for multiple users of a search engine; and
calculating at the client device a rank score for the query trigger based on attributes of the query trigger comprises generating the rank score based on a function of the context of the query trigger, the frequency of occurrence of the query trigger, and the history score of the query trigger.

20. The system of claim 12, further comprising rendering the resource in a first thread of a browser application at the client device;
wherein identifying the query triggers in the resource comprises identifying the query triggers in a second thread of a browser application, the second thread independent of the first thread.

21. A system, comprising:
a data processing apparatus; and
a computer-readable storage medium coupled to the data processing apparatus, the computer-readable medium storing instructions that, when executed by the data processing apparatus, cause the data processing apparatus to perform operations comprising:
sending to a client device a dictionary defining query triggers, each of the query triggers being one or more terms;
sending to the client device a module executable by the client device and upon execution causes the client device to:
identify, at the client device, one or more of the query triggers in a resource, the resource being a non-query resource rendered in an application at the client device, and the identifying the query triggers in the resource including scanning the resource to identify the query triggers defined in the dictionary that are present in the resource;
for each query trigger identified in the resource, calculate at the client device a rank score for the query trigger based on attributes of the query trigger;
rank at the client device the query triggers according to the rank scores;
generate at the client device search query suggestions from the query triggers identified in the resource; and
present at the client device the search query suggestions according to the ranking of the query triggers.

22. The system of claim 21, wherein:
the query triggers include expansion terms, the expansion terms for each query trigger being terms that are query expansions of the one or more terms of the query trigger;
identifying at the client device the query triggers in the resource comprises searching the resource for the query triggers included in the dictionary; and
generating at the client device search query suggestions from the query triggers comprises generating for a query trigger identified in the resource a search query that includes an expansion term of the query trigger.

* * * * *